United States Patent
Chapman et al.

(10) Patent No.: US 12,470,543 B2
(45) Date of Patent: Nov. 11, 2025

(54) TRUSTED MOBILE ENDPOINTS USING WEBVIEW

(71) Applicant: Cisco Technology, Inc., San Jose, CA (US)

(72) Inventors: Harold Todd Chapman, Howell, MI (US); Robert Jacob Linial Small, Ann Arbor, MI (US); Michael G. Brown, Portland, OR (US); Adam Vincent Patruno, Canton, MI (US); Dylan Miles Kite, Ann Arbor, MI (US); Zachary Oliver Weglarz, Ann Arbor, MI (US); Erdenebat Gantumur, Ann Arbor, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 405 days.

(21) Appl. No.: 18/065,040

(22) Filed: Dec. 13, 2022

(65) Prior Publication Data

US 2024/0195798 A1    Jun. 13, 2024

(51) Int. Cl.
| | | |
|---|---|---|
| *H04L 9/40* | (2022.01) | |
| *G06Q 20/38* | (2012.01) | |
| *G06Q 20/40* | (2012.01) | |

(52) U.S. Cl.
CPC ....... *H04L 63/083* (2013.01); *G06Q 20/3821* (2013.01); *G06Q 20/40* (2013.01)

(58) Field of Classification Search
CPC ... H04L 63/083; H04L 63/12; H04L 63/1483; H04L 67/02; H04L 67/146; H04L 2463/082; G06Q 20/3821; G06Q 20/40
See application file for complete search history.

(56) References Cited

U.S. PATENT DOCUMENTS

| | | | | |
|---|---|---|---|---|
| 11,233,802 B1* | 1/2022 | Rudeanu | ............ | H04L 63/0435 |
| 11,528,140 B2* | 12/2022 | Tiffany | ................ | H04L 9/3213 |

(Continued)

FOREIGN PATENT DOCUMENTS

TW        201215062 A     4/2012

OTHER PUBLICATIONS

"Duo Trusted Endpoints—Duo Mobile Verification," © 2022 Duo, https://duo.com/docs/trusted-endpoints-duo-moble, Dec. 3, 2021.

(Continued)

*Primary Examiner* — Ramy M Osman
(74) *Attorney, Agent, or Firm* — Baker Botts L.L.P.

(57) ABSTRACT

In one embodiment, a method, by an authentication server, includes generating a transaction identifier associated with an authentication request received from an external device. In response to verifying a first authentication factor of the authentication request, the method includes transmitting a prompt and the transaction identifier to the external device, wherein the prompt is an HTTP link associated with a browser comprising a generated cookie, the generated cookie being associated with the transaction identifier. The method includes receiving a signal comprising a transmitted transaction identifier and an instruction to process the HTTP link. The method includes instructing an application installed on the external device to open the browser in a webview in response to processing the instruction, wherein a cookie is provided. The method includes identifying the generated cookie based on verifying the transmitted transaction identifier. The method includes determining if the cookie is equivalent to the generated cookie.

18 Claims, 4 Drawing Sheets

(56) References Cited

U.S. PATENT DOCUMENTS

| | | | |
|---|---|---|---|
| 2009/0006861 A1* | 1/2009 | Bemmel | H04L 63/083 |
| | | | 713/189 |
| 2011/0154488 A1* | 6/2011 | Rajan | H04L 63/168 |
| | | | 726/22 |
| 2012/0254935 A1* | 10/2012 | Yato | H04L 9/321 |
| | | | 726/1 |
| 2015/0052584 A1* | 2/2015 | Rudraraju | H04L 63/102 |
| | | | 726/4 |
| 2015/0222615 A1 | 8/2015 | Allain et al. | |
| 2017/0279798 A1* | 9/2017 | Reynolds | H04L 63/0853 |
| 2018/0131686 A1 | 5/2018 | Brannon | |
| 2018/0285552 A1 | 10/2018 | Oberheide et al. | |
| 2018/0351936 A1* | 12/2018 | Battacharya | H04L 67/141 |
| 2019/0253404 A1 | 8/2019 | Briceno et al. | |
| 2019/0354709 A1* | 11/2019 | Brinskelle | G06F 21/31 |
| 2021/0166226 A1 | 6/2021 | Wang | |
| 2021/0258344 A1* | 8/2021 | Kula | H04L 67/54 |
| 2022/0131854 A1* | 4/2022 | Joshi | G06Q 20/40 |
| 2022/0329579 A1 | 10/2022 | Grinman | |
| 2022/0337590 A1* | 10/2022 | Jaiswal | H04L 63/0815 |
| 2022/0385656 A1* | 12/2022 | Gujarathi | H04L 63/0876 |
| 2023/0006844 A1* | 1/2023 | Cohen | H04L 9/3297 |
| 2023/0014970 A1* | 1/2023 | Gujarathi | H04L 63/10 |
| 2024/0037279 A1* | 2/2024 | Marudi | H04L 63/1416 |
| 2024/0195798 A1* | 6/2024 | Chapman | G06Q 20/3821 |

OTHER PUBLICATIONS

International Search Report and Written Opinion for International Application No. PCT/US2023/082222, mailed Mar. 15, 2024, 12 Pages.

\* cited by examiner

TRUSTED MOBILE ENDPOINTS USING WEBVIEW

TECHNICAL FIELD

The present disclosure relates generally to communication networks, and more particularly, to determining trusted mobile endpoints using webview.

BACKGROUND

Authentication is the process of an entity proving its identity to another entity. An individual may gain access to a computer system by identifying and authenticating themselves using a login. Logins are used by computers, applications, and websites to prevent unauthorized access to confidential data. Currently, users can log into their devices by using a combination of a username and password. The username uniquely identifies the user using the device and the password is used to authenticate the user to the device. However, passwords can be cumbersome. Easy-to-remember passwords and the repetitive use of the same password may present security issues, and users may forget their passwords.

DESCRIPTION OF EXAMPLE EMBODIMENTS

Overview

In particular embodiments, an authentication server may comprise one or more processors and one or more computer-readable non-transitory storage media coupled to one or more of the processors. The one or more computer-readable non-transitory storage media may comprise instructions operable when executed by one or more of the processors to cause the authentication server to generate a transaction identifier associated with an authentication request received from an external device. In response to verifying a first authentication factor of the authentication request, the processors may be operable when executing the instructions to transmit a prompt and the transaction identifier to the external device, wherein the prompt is an HTTP link associated with a browser comprising a generated cookie, and the generated cookie is associated with the transaction identifier. The processors may be operable when executing the instructions to receive a signal comprising a transmitted transaction identifier and an instruction to process the HTTP link. The processors may be operable when executing the instructions to instruct an instance of an application installed on the external device to open the browser in a webview in response to processing the instruction, wherein a cookie is provided. The processors may be operable when executing the instructions to identify the generated cookie based on verifying the transmitted transaction identifier. The processors may be operable when executing the instructions to determine if the cookie is equivalent to the generated cookie.

In particular embodiments, a method, by an authentication server, to prevent second factor phishing may comprise generating a transaction identifier associated with an authentication request received from an external device. The method may further comprise transmitting a prompt and the transaction identifier to the external device in response to verifying a first authentication factor of the authentication request, wherein the prompt is an HTTP link associated with a browser comprising a generated cookie, and the generated cookie is associated with the transaction identifier. The method may further comprise receiving a signal comprising a transmitted transaction identifier and an instruction to process the HTTP link. The method may further comprise instructing an instance of an application installed on the external device to open the browser in a webview in response to processing the instruction, wherein a cookie is provided. The method may further comprise identifying the generated cookie based on verifying the transmitted transaction identifier. The method may further comprise determining if the cookie is equivalent to the generated cookie.

In particular embodiments, one or more computer-readable non-transitory storage media may embody software that is operable on an authentication server, when executed, to: generate a transaction identifier associated with an authentication request received from an external device. The software may be operable when executed to transmit a prompt and the transaction identifier to the external device in response to verifying a first authentication factor of the authentication request, wherein the prompt is an HTTP link associated with a browser comprising a generated cookie, and the generated cookie is associated with the transaction identifier. The software may be operable when executed to receive a signal comprising a transmitted transaction identifier and an instruction to process the HTTP link. The software may be operable when executed to instruct an instance of an application installed on the external device to open the browser in a webview in response to processing the instruction, wherein a cookie is provided. The software may be operable when executed to identify the generated cookie based on verifying the transmitted transaction identifier. The software may be operable when executed to determine if the cookie is equivalent to the generated cookie.

Technical advantages of certain embodiments of this disclosure may include one or more of the following. Certain systems and methods described herein use a randomly generated cookie to determine if an endpoint is a trusted endpoint, which may prevent second factor phishing from a bad actor. For example, in certain authentication processes, a bad actor may have a user's credentials and may be able to satisfy a first factor authentication process. The bad actor may typically forward a link to be accessed by the user on the user's device for a second factor authentication process. Typically, a cookie may correspond to each link. In certain embodiments of the present disclosure, an authentication server may generate a cookie corresponding to a request to access a resource having a random value and assign that cookie to a link to be accessed by the user. The authentication server may then compare a cookie transmitted by the user accessing the link to the generated cookie to determine if the user has accessed a link provided by the authentication server or by a bad actor. The authentication server can then deny access when a bad actor has provided the link to the user, thereby preventing second factor phishing.

Certain embodiments of this disclosure improve the user experience by eliminating password and secrets fatigue while providing unified access to several applications and services. In certain embodiments, security is strengthened by reducing and/or eliminating password management techniques, which may reduce credential theft and/or impersonation. In some embodiments, the embodiments described herein simplify information technology (IT) operations by reducing and/or eliminating the need to issue, secure, rotate, reset, and/or manage passwords.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In general, a user of an endpoint device may authenticate with an authentication server in connection with accessing a resource. The authentication server may perform a procedure that includes authenticating a first authentication factor and a second authentication factor. Authenticating the first authentication factor may include verifying that endpoint device has provided valid login credentials associated with the user. Examples of login credentials include a username and password. Authenticating the second authentication factor may include performing a real-time verification of the user of endpoint device. For example, the authentication server may verify whether the user of the endpoint device responds affirmatively and promptly to a prompt for an authentication decision.

Second factor phishing can occur when a bad actor has stolen a user's primary credentials (e.g., a username and password) and then attempts to gain access to systems pretending to be the victim. The bad actor is hoping that, even if multi-factor authentication (MFA) is in place, end users will be overly conditioned to accept the second factor. In these cases, the end user may select "accept" on the mobile push notification, which provides the attacker access and effectively bypasses MFA. For typical mobile authentication, a device displaying a prompt for the second factor is the same as that used to approve the authentication request. However, the device does not know if the device sending the prompt is a trusted device.

Certain embodiments described herein provide verification, by an authentication server, that a link accessed by a user is authentic and not provided by a bad actor. A link prompting user input (such as clicking the link) may be sent to a user's mobile device. The user can then access the link to be re-directed to perform an authentication on that user's mobile device and approve access to log in. The present disclosure contemplates generating and assigning a cookie to that link when a request is made to the authentication server to provide access. When the user's mobile device accesses the link, the cookie is transmitted back to the authentication server. The authentication server can determine if the transmitted cookie is the same cookie previously generated for that request. This comparison prevents second factor phishing by a bad actor and can establish the user's mobile device as a trusted endpoint device.

Figure 1:
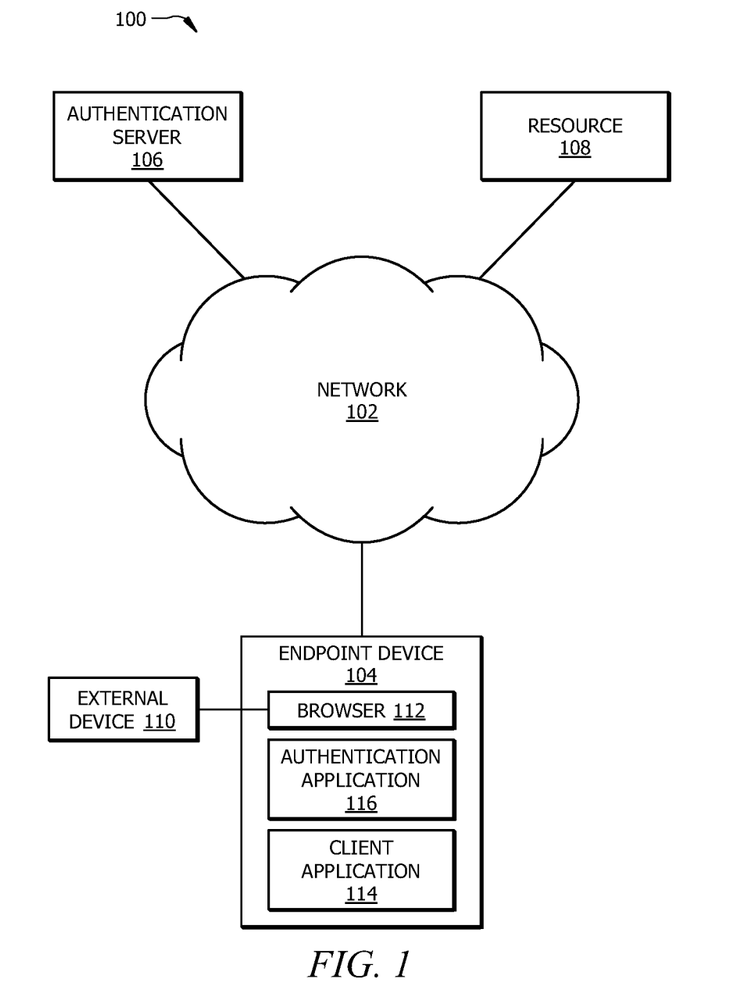
FIG. 1 illustrates an example network to authenticate an endpoint device.

FIG. 1 illustrates an example system 100 for preventing second factor phishing and for authenticating an endpoint device. System 100 or portions thereof may be associated with an entity, which may include any entity, such as a business, company, or enterprise, configured to authenticate a user. In certain embodiments, the entity may be a service provider that provides authentication and/or security services. The components of system 100 may include any suitable combination of hardware, firmware, and software. For example, the components of system 100 may use one or more elements of the computer system of FIG. 4. In the illustrated embodiment of FIG. 1, system 100 includes a network 102, an endpoint device 104, an authentication server 106, a resource 108, and an external device 110.

Network 102 of system 100 is any type of network that facilitates communication between components of system 100. Network 102 may connect one or more components of system 100. One or more portions of network 102 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 102 may include one or more different types of networks.

Network 102 may be any communications network, such as a private network, a public network, a connection through the Internet, a mobile network, a WI-FI network, etc. Network 102 may include a core network, an access network of a service provider, an Internet service provider (ISP) network, and the like. One or more components of system 100 may communicate over network 102. Network 102 may include one or more nodes. Nodes are connection points within network 102 that receive, create, store and/or send data along a path. Nodes may include one or more redistribution points that recognize, process, and forward data to other nodes of network 102. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. The nodes of network 102 may include one or more devices.

Endpoint device 104 may refer to a device that a user uses to communicate with other components of system 100 via network 102. A user of system 100 may be a person or group of persons who utilize one or more devices of system 100. The user may be associated with one or more accounts. The user may be a local user, a remote user, an administrator, a customer, a company, a combination thereof, and the like. The user may be associated with a username, a password, a user profile, etc. Without limitations, external device 110 may function similarly to endpoint device 104 and/or may include the same components as endpoint device 104. However, external device 110 may be associated with a bad actor, and the bad actor may be attempting to access the resource 108 through the user and/or endpoint device 104.

Examples of the endpoint device 104 and external device 110 may include a desktop computer system, a laptop or notebook computer system, a mobile telephone (such as a smartphone), a personal digital assistant (PDA), a tablet computer system, and so on. In certain embodiments, endpoint device 104 and/or external device 110 may include a liquid crystal display (LCD), an organic light-emitting diode (OLED) flat screen interface, digital buttons, a digital keyboard, physical buttons, a physical keyboard, one or more touch screen components, a graphical user interface (GUI), and the like. The user may further use endpoint device 104 to receive and respond to certain authentication factors. Similarly, the bad actor may use external device 110 to receive and respond to certain authentication factors. For example, the user may have an account established with a policy server (e.g., Cisco® Identity Services Engine (ISE)), and the user may have pre-configured the account such that second authentication factors are pushed to an application running on the endpoint device 104. As one example, the user may have an account established with an authentication application, such as Cisco Duo®, and the user may have pre-configured the account such that authentication prompts, such as Duo-pushes, are pushed to a Duo® Connect application running on endpoint device 104.

In certain embodiments, endpoint device 104 may include a user's browser 112, one or more client applications 114, and an instance of an authentication application 116. As an example, user's browser 112 may represent a web browser (e.g., application software for accessing the World Wide Web). Browser 112 may be a software program that allows a user to view web pages on a device. In certain embodiments, browser 112 is installed on one or more devices of system 100. Browser 112 may include a GUI for displaying and navigating between web pages. In some embodiments, browser 112 retrieves content from a website's web server and displays the content on one or more devices, such as endpoint device 104. Browser 112 may be one of the following types of browsers: Google Chrome, Mozilla Firefox, Edge, Safari, Opera, Konqueror, Lynx, Vivaldi, and the like. In certain embodiments, browser 112 may be supported by authentication server 106. In some embodiments, a user of a device uses browser 112 installed on the device to log into device.

A client application 114 may include a computer program configured to carry out a specific task used by the user. Examples of a client application 114 may include a remote desktop application, an email application, a word processing application, a spreadsheet application, a slide presentation application, a media player application, a business-specific application (such as accounting software), or other application. In certain embodiments, the client application 114 includes a thick application (e.g., an application that runs on an endpoint device, for example, such that most of the logic is handled locally by the endpoint device).

Authentication server 106 of system 100 may be computer hardware and/or software (e.g., a computer program) that provides authentication services to devices, such as sharing data and/or resources with devices and/or performing computation for devices. In certain embodiments, authentication server 106 is a security platform that provides authentication services (e.g., MFA, two-factor authentication (2FA), etc.), endpoint security, remote access solutions, device health, and the like. The authentication server 106 may perform a procedure that includes authenticating a first authentication factor and a second authentication factor. Authenticating the first authentication factor may include verifying that endpoint device 104 and/or external device 110 has provided valid login credentials associated with the user. For example, in one instance, the user may be providing the valid login credentials associated with the user via the endpoint device 104. In another instance, the bad actor may be providing the valid login credentials associated with the user via the external device 110 during a phishing attempt. Authenticating the second authentication may include performing a real-time verification of the user through endpoint device 104. For example, authentication server 106 may verify whether the user of the endpoint device 104 responds affirmatively and promptly to a prompt (e.g., a Duo prompt, such as a Duo push notification) configured or managed by a service provider.

As discussed above, the multi-factor authentication procedure may include a real-time verification factor. The real-time verification includes any suitable verification that obtains an input from the user in real time. The real-time verification of the user may be performed in any suitable manner. As an example, the real-time verification may ask the user to supply a one-time passcode (e.g., a passcode pushed to or generated by an application running on the user's smartphone or computer, a passcode obtained from a hardware token issued to the user, a passcode sent to the user by text message or phone call, etc.). As another example, the real-time verification may ask the user to acknowledge a notification, such as by accepting a prompt pushed to the user's smartphone or computer via an application or text message, or by accepting a phone call notification (e.g., by pressing "1" or saying "yes" when prompted). In embodiments implemented using a Duo system, the real-time verification may be a Duo prompt (such as a Duo push, which may push a login request to an endpoint device associated with the user—the user reviews the login request and taps Approve to log in).

In embodiments, the real-time verification factor may be provided by the user after the user is re-directed to an application through a link, and the real-time verification factor is provided via the application (i.e., such as authentication application 116). The link may be provided to the endpoint device 104 in response to satisfying a first multi-factor authentication procedure by authenticating a first authentication factor. Authentication of the first authentication factor is based on verifying a login credential of the user with a received authentication request. In typical embodiments, the authentication server 106 may transmit the link to the endpoint device 104. In certain embodiments, the link may be intercepted and/or received by a bad actor through the external device 110, and the external device 110 then forwards the link to the endpoint device 104. Without limitations, the link may be a hypertext transfer protocol ("HTTP") link or any other suitable link.

The real-time verification may be performed using any suitable endpoint device associated with the user (e.g., endpoint device 104). The endpoint device may be the same endpoint device as that used to authenticate with and then access resource 108, or a different endpoint device associated with the user may be used. As an example, the user may seek to access the resource 108 using a laptop of the user. In one embodiment, the real-time verification may be performed using the same laptop. In another embodiment, the real-time verification may be performed using a different endpoint device, such as the user's smartphone. For example, authentication server 106 may authenticate login credentials (e.g., username and password) received from the user's laptop and may then push a real-time verification request to the user's smartphone. The authentication may determine to push the real-time verification request to the user's smartphone based on information configured for a user account that a service provider associates with the user. For example, the user may have pre-configured the user account to send real-time verification requests to the user's smartphone.

The resource 108 may refer to a resource for which multi-factor authentication is enforced. Depending on the embodiment, an authentication factor may be enforced by authentication server 106, the resource 108 itself, a service provider, and/or any other suitable component. Certain embodiments enforce each authentication factor at the same component (as one example, authentication server 106 may enforce both the first authentication factor and the second authentication factor), and other embodiments use more than one component to enforce the authentication factors (as one example, authentication server 106 may enforce the first authentication factor, and a service provider may enforce the second authentication factor).

The resource 108 may be located outside of an organization network and/or within an organization network. In certain embodiments, an endpoint device communicates with resource 108 via a browser (such as browser 112). In such embodiments, resource 108 may be any resource that is accessed through the browser and protected by multi-factor authentication. As an example, endpoint device 104 may communicate with resource 108 via user's browser 112. As another example, endpoint device 104 may communicate with resource 108 via an embedded browser of a client application 114 or an external browser triggered by a client application 114.

In embodiments, endpoint device 104 may include an instance of the authentication application 116. The authentication application 116 may be a mobile, software, and/or web application that a user may log into to access information and/or to communicate with authentication server 106. The user may be verified using multi-factor authentication to use the authentication application 116. In embodiments, the real-time verification factor may be supplied to the authentication server 106 via the authentication application 116. The user may be directed to the authentication application 116 by accessing the aforementioned link provided in response to sufficiently providing the first authentication factor.

Both, endpoint device 104 and external device 110 may be communicatively coupled to authentication server 106 through the network 102. In embodiments, the external device 110 associated with the bad actor may not be registered to perform the real-time verification of the second authentication factor during multi-factor authentication, but the endpoint device 104 may be registered and/or configured to perform the real-time verification. In these embodiments, a link may be transmitted to the endpoint device 104 to initiate a second multi-factor authentication procedure to provide the real-time verification. The authentication server 106 may be configured to verify that the link is authentic, and not sent by a bad actor, by comparing the cookie associated with that link to a cookie generated in response to receiving the authentication request and then assigned to the link. If the cookies are equivalent, the link may be determined to be authentic. If the cookies are not equivalent, the authentication server 106 may determine that the link was provided by some other device (such as external device 110).

Although FIG. 1 describes and illustrates particular components, devices, or systems carrying out particular actions, this disclosure contemplates any suitable combination of any suitable components, devices, or systems carrying out any suitable actions.

Figure 2:
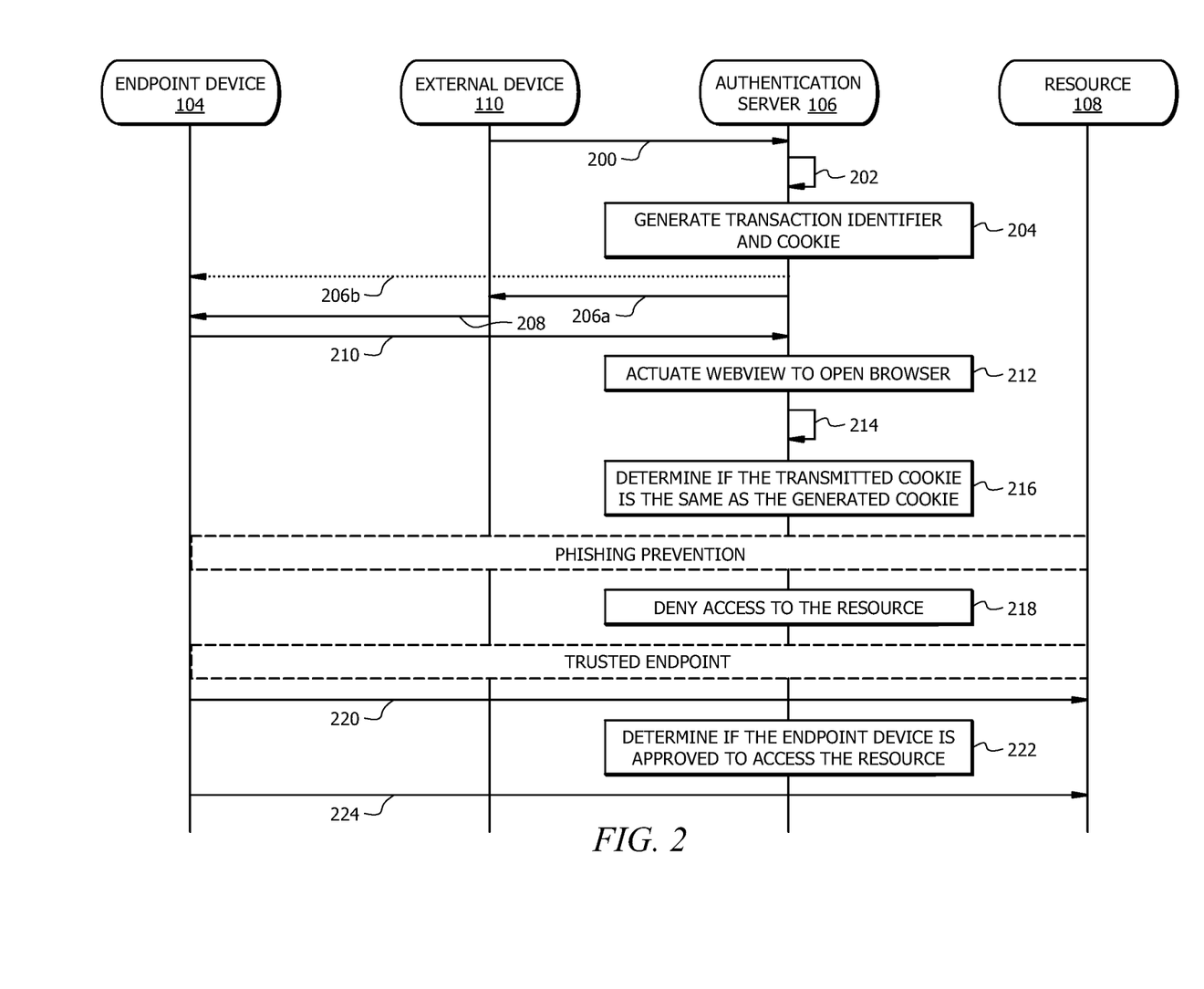
FIG. 2 illustrates an example message flow to authenticate an endpoint device.

FIG. 2 illustrates an example traffic relay between endpoint device 104, external device 110, authentication server 106, and resource 108. The illustrated traffic relay of FIG. 2 may be used by system 100 of FIG. 1. At step 200, a bad actor may begin logging into a webpage through a browser or into a client application to access a resource 108. The bad actor may be redirected to provide user information as log-in credentials associated with a first authentication factor for verifying the external device 110 for accessing the resource 108. This process may be referred to as an authentication request. In embodiments, the bad actor may be attempting to access a resource 108 associated with a user and may be providing user information corresponding to that user. At step 202, the authentication server 106 may receive the user information and perform a first multi-factor authentication procedure by authenticating the first authentication factor, where authentication of the first authentication factor is based on verifying the login credential with the received user information. In embodiments, the authentication server 106 may further generate a transaction identifier associated with the authentication request received from the external device 110. The transaction identifier may be a designated parameter operable to identify which authentication request is to be completed by the authentication server 106. The authentication server 106 may store a plurality of transaction identifiers for a plurality of received authentication requests. At step 204, upon verification, the authentication server 106 may generate a cookie to be assigned to a prompt to be provided to the user. The generated cookie further corresponds to the generated transaction identifier. In embodiments, the generated cookie may have any suitable random value. The authentication server 106 may further store each generated cookie and to which transaction identifier that cookie corresponds. In certain embodiments, the generation of the transaction identifier may occur in step 204 rather than in step 202. The depicted traffic relay may then split between step 206*a* or step 206*b*.

At step 206*a*, the authentication server 106 may transmit a prompt and the generated transaction identifier to the external device 110. The prompt may be an HTTP link associated with a browser including the generated cookie from step 204. The prompt may be a request to provide an authentication decision associated with a second authentication factor necessary for accessing resource 108. In embodiments, the authentication server 106 may transmit the prompt and generated transaction identifier to any suitable device that initiated the authentication request in step 200. For example, in an embodiment where the user initiated the authentication request from the endpoint device 104, the authentication server 106 may transmit the prompt and the generated transaction identifier to the endpoint device 104. This is illustrated in step 206*b*, where the user is attempting to access the resource 108, not the bad actor.

At step 208, the external device 110 may forward the received prompt and the generated transaction identifier to the endpoint device 104. Forwarding the prompt may occur through one or more suitable phishing communication channels. In embodiments, the prompt received by the endpoint device 104 may be different from the prompt initially received by the external device 110. For example, the underlying cookie of the browser may not be transmitted during the transmission between external device 110 and endpoint device 104.

At step 210, the endpoint device 104 may have received the prompt and generated transaction identifier through step 206*a* or step 206*b*. In response, the user may attempt to access the prompt through user input (i.e., clicking the link), and the endpoint device 104 may transmit an instruction to the authentication server 106 to process the HTTP link. The transmission may further include the generated transaction identifier received by the endpoint device 104. At step 212, the authentication server 106 may receive a signal including the instruction and generated transaction identifier. The authentication server 106 may then instruct an instance of an application (such as client application 114) installed on the device to open a browser (such as browser 112) in a webview to view the HTTP link in response to processing the received instruction. The opened browser may include a cookie. At step 214, the authentication server 106 may identify the generated cookie from step 204 that is associated with this authentication request based on verifying the received transaction identifier. For example, the authentication server 106 may not initially know which authentication request the received signal is associated to. The authentication server 106 may compare the received transaction identifier, that was previously generated and stored by authentication server 106, to those stored in the authentication server 106. Upon identifying the transaction identifier stored in the server 106, the authentication server 106 may identify which cookie corresponds to that transaction identifier.

At step 216, the authentication server 106 may determine if the transmitted cookie from the endpoint device 104 is equivalent to the generated cookie from step 204. When using a browser to access an HTTP link, the underlying cookie may be unique to each instance of the browser. The authentication server 106 may compare the cookie of the opened browser from step 212 to the previously generated cookie identified in step 214. If there is a determination that the cookie is not equivalent to the previously generated cookie, the traffic relay proceeds to step 218. Otherwise, the traffic relay proceeds to step 220. At step 218, the authentication server 106 may determine that the prompt and transaction identifier was transmitted to the endpoint device 104 by a bad actor through the external device 110. The authentication server 106 may then deny access to the resource 108 associated with the authentication request.

In response to determining that the cookie is equivalent to the previously generated cookie, authentication server 106 may determine that the received signal was transmitted by a trusted endpoint device. At step 220, the endpoint device 104 may transmit an authentication decision including user input in response to accessing the prompt through the network 102. The authentication decision may correspond to user input in the form of selecting "accept" or "deny" on a mobile push notification, a local platform authenticator (i.e., touch ID), a biometric authenticator (i.e., fingerprint scanner), and any combination thereof. At step 222, the authentication server 106 may receive the authentication decision and determine if the user input provided as the authentication decision will allow or deny access for the endpoint device 104. At step 224, the authentication server 106 may permit the endpoint device 104 to access the resource 108 based on determining that the endpoint device 104 successfully completed the second multi-factor authentication procedure, and the endpoint device 104 may access the resource 108.

Figure 3:
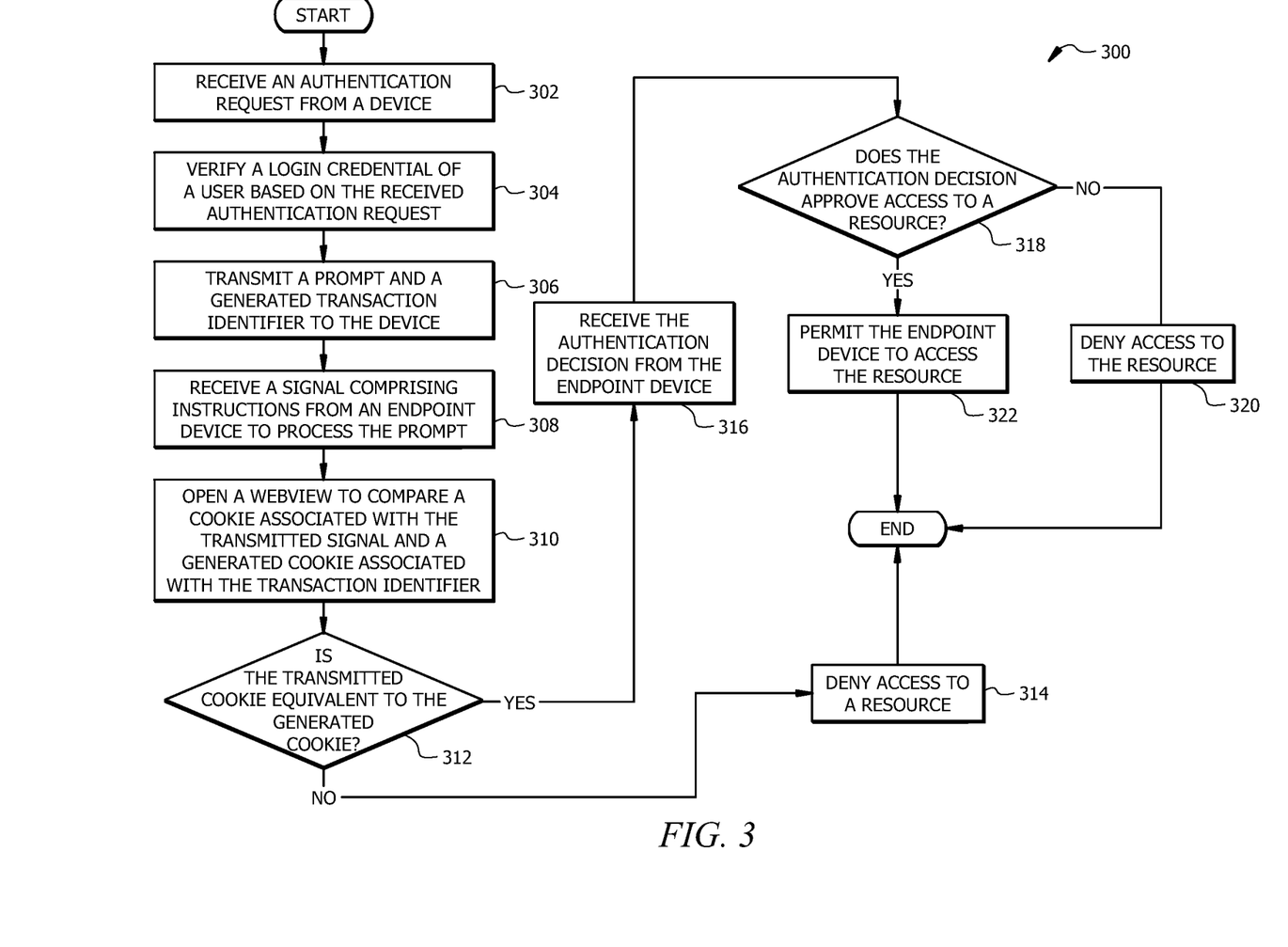
FIG. 3 illustrates an example method for preventing second factor phishing.

FIG. 3 illustrates an example method 300 to authenticate endpoint device 104 (referring to FIG. 1) and to prevent second factor phishing. The method 300 may begin at step 302, where the authentication server 106 (referring to FIG. 1) may receive an authentication request. The authentication request may include user information associated with a first authentication factor to verify that an unknown user device can access a resource 108 (referring to FIG. 1). In embodiments, a user may be attempting to access the resource 108 through a browser 112 (referring to FIG. 1) and/or a client application 114 (referring to FIG. 1) through the endpoint device 104. In other embodiments, a bad actor may be attempting to access the resource 108. The request may come from an external device 110 (referring to FIG. 1) operated by a bad actor or from the endpoint device 104 operated by the user. The user and/or bad actor may provide user information to prove the identity of the user.

At step 304, the authentication server 106 may perform a first multi-factor authentication procedure by authenticating a first authentication factor. Authentication of the first authentication factor may be based on verifying a login credential with the received user information. In certain embodiments, access to resource 108 may be granted to any suitable endpoint device after satisfactorily performing the first multi-factor procedure if the authentication server 106 does not require multi-factor authentication. In other embodiments, the method 300 proceeds to step 306. At step 306, the authentication server 106 may generate a transaction identifier associated with the authentication request. The transaction identifier may be a designated parameter operable to identify which authentication request is to be completed by the authentication server 106. The authentication server 106 may further generate a cookie to be assigned to a prompt to be provided to the user, where the generated cookie further corresponds to the generated transaction identifier. The authentication server 106 may then transmit a prompt and the generated transaction identifier to the device that initiated the authorization request. The prompt is an HTTP link associated with a browser including the generated cookie.

At step 308, the authentication server 106 may receive a signal including a transmitted transaction identifier and an instruction to process the HTTP link from the endpoint device 104. In embodiments, the endpoint device 104 may have received the prompt and the previously generated transaction identifier from the authentication server 106 from step 306 or from the external device 110 which had received the prompt and the generated transaction identifier from step 306. The prompt may be operable to provide an authentication decision associated with a second authentication factor.

At step 310, the authentication server 106 may instruct an instance of an application (such as client application 114) installed on the device to open a browser (such as browser 112) in a webview in response to processing the instruction to process the HTTP link. The authentication server 106 may identify the generated cookie from step 306 that is associated with this authentication request based on verifying the received transaction identifier from the endpoint device 104. For example, the authentication server 106 may not initially know which authentication request the received signal is associated to. The authentication server 106 may compare the received transaction identifier, that was previously generated and stored by authentication server 106 in step 306, to those stored in the authentication server 106. Upon identifying the transaction identifier stored in the server 106, the authentication server 106 may identify which generated cookie corresponds to that transaction identifier.

At step 312, the authentication server 106 may determine whether the cookie present in the opened browser in the webview is equivalent to the identified cookie from step 310. When using a browser to access an HTTP link, the underlying cookie may be unique to each instance of the browser. The authentication server 106 may compare the cookie of the opened browser to the previously generated cookie identified in step 310. If there is a determination that the cookie is not equivalent to the generated cookie, the method 300 proceeds to step 314. Otherwise, the method proceeds to step 316. At step 314, the authentication server 106 may determine that the prompt and transaction identifier were transmitted to the endpoint device 104 by a bad actor through the external device 110. The authentication server 106 may then deny access to the resource 108 associated with the authentication request.

At step 316, the authentication server 106 may determine that the prompt and transaction identifier were not transmitted to the endpoint device 104 by a bad actor and may proceed to receive the authentication decision from the endpoint device 104. At step 318, the authentication server 106 may determine if the authentication decision approves access to the resource 108. The authentication server 106 may be configured to analyze the user input provided as the authentication decision to make this determination. If the authentication decision does not approve access, the method 300 proceeds to step 320. Otherwise, the method proceeds to step 322. At step 320, in response to determining that the authentication decision denies access to the resource 108, the authentication server 106 may deny the endpoint device 104 access to the requested resource 108. The method 300 may then end. At step 322, in response to determining that the authentication decision approves access to the resource 108, the authentication server 106 may permit the endpoint device 104 to access the resource 108 based on determining that the endpoint device 104 successfully completed a second multi-factor authentication procedure. The method 300 may then end.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method to authenticate endpoint device 104 and to prevent second factor phishing, including the particular steps of the method of FIG. 3, this disclosure contemplates any suitable method including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
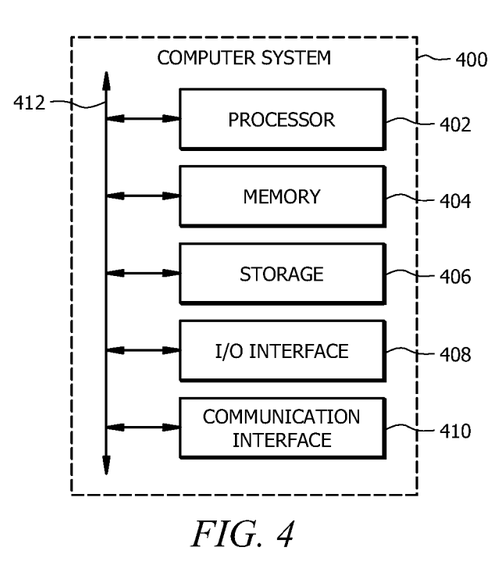
FIG. 4 illustrates an example computer system.

FIG. 4 illustrates one or more components of an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate. Further, each one of endpoint device 104, external device 110, and authentication server 106 in FIG. 1 may be any suitable computer system, such as the illustrated computer system 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a non-transitory computer-readable storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A non-transitory computer-readable storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An authentication server, comprising:
one or more processors; and
one or more computer-readable non-transitory storage media comprising instructions that, when executed by the one or more processors, cause one or more components of the authentication server to perform operations comprising:
generating a transaction identifier associated with an authentication request received from an external device, wherein the authentication request is part of a multi-factor authentication procedure;
in response to verifying a first authentication factor of the authentication request, transmitting a prompt and the transaction identifier to the external device, wherein the prompt is an HTTP link associated with a browser comprising a generated cookie that is generated at the authentication server and wherein the generated cookie comprises a random value corresponding to the transaction identifier;
receiving a signal comprising the transaction identifier and an instruction to process the HTTP link;
instructing an instance of an application installed on the external device to open the browser in a webview in response to processing the instruction, wherein a cookie is stored in the browser;
identifying the generated cookie based on verifying the transaction identifier;
determining if the cookie is equivalent to the generated cookie; and
in response to determining that the cookie is not equivalent to the generated cookie, determining that the prompt and the transaction identifier transmitted to the external device was subsequently forwarded by the external device to a trusted endpoint device, wherein the trusted endpoint device is associated with a user having previously established authentication with the authentication server, wherein the generated cookie was not transmitted to the trusted endpoint device when the external device forwarded the prompt and the transaction identifier to the trusted endpoint device.

2. The authentication server of claim 1, the operations further comprising:
performing a first multi-factor authentication procedure by authenticating the first authentication factor, wherein authentication of the first authentication factor is based on verifying a login credential of the user with the received authentication request.

3. The authentication server of claim 1, the operations further comprising:
denying access to a resource associated with the authentication request.

4. The authentication server of claim 1, the operations further comprising:
in response to determining that the cookie is equivalent to the generated cookie, determining that the received signal was transmitted by a trusted endpoint device; and
receiving an authentication decision associated with a second authentication factor from the trusted endpoint device via the prompt.

5. The authentication server of claim 4, the operations further comprising:
permitting the trusted endpoint device to access a resource associated with the authentication request based on determining that the trusted endpoint device successfully completed a second multi-factor authentication procedure.

6. The authentication server of claim 1, wherein the authentication request is a request to perform a multi-factor authentication procedure to verify the first authentication factor and a second authentication factor.

7. A method to prevent second factor phishing, comprising:
generating a transaction identifier associated with an authentication request received from an external device, wherein the authentication request is part of a multi-factor authentication procedure;
in response to verifying a first authentication factor of the authentication request, transmitting a prompt and the transaction identifier to the external device, wherein the prompt is an HTTP link associated with a browser comprising a generated cookie that is generated at the authentication server, and wherein the generated cookie comprises a random value corresponding to the transaction identifier;
receiving a signal comprising the transaction identifier and an instruction to process the HTTP link;
instructing an instance of an application installed on the external device to open the browser in a webview in response to processing the instruction, wherein a cookie is stored in the browser;

identifying the generated cookie based on verifying the transaction identifier;

determining if the cookie is equivalent to the generated cookie; and in response to determining that the cookie is not equivalent to the generated cookie, determining that the prompt and the transaction identifier transmitted to the external device was subsequently forwarded by the external device to a trusted endpoint device, wherein the trusted endpoint device is associated with a user having previously established authentication with an authentication server, wherein the generated cookie was not transmitted to the trusted endpoint device when the external device forwarded the prompt and the transaction identifier to the trusted endpoint device.

8. The method of claim 7, further comprising:
performing a first multi-factor authentication procedure by authenticating the first authentication factor, wherein authentication of the first authentication factor is based on verifying a login credential of the user with the received authentication request.

9. The method of claim 7, further comprising:
denying access to a resource associated with the authentication request.

10. The method of claim 7, further comprising:
in response to determining that the cookie is equivalent to the generated cookie, determining that the received signal was transmitted by a trusted endpoint device; and
receiving an authentication decision associated with a second authentication factor from the trusted endpoint device via the prompt.

11. The method of claim 10, further comprising:
permitting the trusted endpoint device to access a resource associated with the authentication request based on determining that the trusted endpoint device successfully completed a second multi-factor authentication procedure.

12. The method of claim 7, wherein the authentication request is a request to perform a multi-factor authentication procedure to verify the first authentication factor and a second authentication factor.

13. A non-transitory computer-readable medium comprising instructions that are configured, when executed by a processor, to:
generate a transaction identifier associated with an authentication request received from an external device, wherein the authentication request is part of a multi-factor authentication procedure;
in response to verifying a first authentication factor of the authentication request, transmit a prompt and the transaction identifier to the external device, wherein the prompt is an HTTP link associated with a browser comprising a generated cookie that is generated at the authentication server, and wherein the generated cookie comprises a random value corresponding to the transaction identifier;
receive a signal comprising the transaction identifier and an instruction to process the HTTP link;
instruct an instance of an application installed on the external device to open the browser in a webview in response to processing the instruction, wherein a cookie is stored in the browser;
identify the generated cookie based on verifying the transaction identifier;
determine if the cookie is equivalent to the generated cookie; and
in response to determining that the cookie is not equivalent to the generated cookie, determining that the prompt and the transaction identifier transmitted to the external device was subsequently forwarded by the external device to a trusted endpoint device, wherein the trusted endpoint device is associated with a user having previously established authentication with an authentication server, wherein the generated cookie was not transmitted to the trusted endpoint device when the external device forwarded the prompt and the transaction identifier to the trusted endpoint device.

14. The non-transitory computer-readable medium of claim 13, wherein the instructions are further configured to:
perform a first multi-factor authentication procedure by authenticating the first authentication factor, wherein authentication of the first authentication factor is based on verifying a login credential of the user with the received authentication request.

15. The non-transitory computer-readable medium of claim 13, wherein the instructions are further configured to:
deny access to a resource associated with the authentication request.

16. The non-transitory computer-readable medium of claim 13, wherein the instructions are further configured to:
in response to determining that the cookie is equivalent to the generated cookie, determine that the received signal was transmitted by a trusted endpoint device; and
receive an authentication decision associated with a second authentication factor from the trusted endpoint device via the prompt.

17. The non-transitory computer-readable medium of claim 16, wherein the instructions are further configured to:
permit the trusted endpoint device to access a resource associated with the authentication request based on determining that the trusted endpoint device successfully completed a second multi-factor authentication procedure.

18. The non-transitory computer-readable medium of claim 13, wherein the authentication request is a request to perform a multi-factor authentication procedure to verify the first authentication factor and a second authentication factor.

* * * * *